United States Patent Office
3,767,795
Patented Oct. 23, 1973

3,767,795
METHOD FOR COMBATING CERTAIN VIRUS INFECTION
Joseph Bernard Schleicher, Lake Bluff, and William R. Roderick, Libertyville, Ill., assignors to Abbott Laboratories, Chicago, Ill.
No Drawing. Filed Feb. 25, 1971, Ser. No. 119,056
Int. Cl. A61k 27/00
U.S. Cl. 424—212                2 Claims

ABSTRACT OF THE DISCLOSURE

A method of preventing or treating herpes virus infections in animals by administering phosphonoacetic acid or its salts.

BACKGROUND OF THE INVENTION

Herpes virus infections, though common, are difficult to prevent or treat because of the lack of effective drugs. An effective anti-herpes drug could be used in the treatment or prevention of herpes dermatitis, herpes genitalis, herpes keratitis, and herpes encephalitis. Herpes virus is the single, most important infectious agent causing blindness in the United States. Although herpes dermatitis is a very common though minor disease, better control of herpes dermatitis could result in fewer cases of herpetic keratitis. The basic treatment presently available for herpetic keratitis is idoxuridine, and no specific drug is available for herpes dermatitis.

SUMMARY OF THE INVENTION

The invention relates to a method of treating the effects of herpes infections comprising administering to an infected warm-blooded animal phosphonoacetic acid and its salts, the structure of phosphonoacetic acid being as follows:

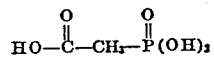

The compounds are active against herpes viruses, particularly herpes simplex virus types 1 and 2 and vaccinia virus. The compounds are administered either as the acid or as the alkali metal salts particularly the mono, di, or trisodium salt or the calcium salt. The activity against herpes virus is restricted to phosphonoacetic acid and its group, or ethylene or propylene group, for example, are required, with an unsubstituted methylene group connecting them. Compounds with a substituted methylene group, or ethylene or propylene group, for example, are inactive. Phosphonoacetic acid and its salts inhibit replication of herpes simplex virus types 1 and 2 and vaccinia virus in tissue culture. The compounds are preferably administered topically but can be given orally or intraperitoneally (i.p.). Exemplifying the activity in vivo, phosphonoacetic acid is active topically against herpes keratitis in the infected rabbit eye and both phosphonoacetic acid and its sodium and calcium salts are active against herpes dermatitis when applied topically to mice infected with herpes type 2 virus. The disodium compound causes a 60–100% increase in survival of mice infected with herpes simplex.

DETAILED DESCRIPTION

Example 1

Phosphonoacetic acid and its disodium salt are active against herpes dermatitis when applied topically to mice infected cutaneously with herpes type 2 virus. The acid is effective at concentrations as low as 0.2%; a 2% concentration of the salt being required. Herpes dermatitis in mice has the disadvantage that since the virus is especially neurotropic in this species, the disease rapidly progresses from localized skin lesions to central nervous system involvement with paralysis and death. There is good correlation in mice between lesion development and subsequent death so that a compound which reduces the number of deaths generally also decreases the number and severity of skin lesions. Consequently, the criterion used for determining activity of a compound in vivo against herpes dermatitis is reduction in the number of deaths. Activity was demonstrated when the compound was administered intraperitoneally or orally, but high dosages are required, the therapeutic ratio is low, and the efficacy is less than that obtained with topical treatment.

Representative in vivo results against herpes dematitis are as follows:

| Compound | Route | Mg./kg. per day | Days | Percent reduction in deaths |
|---|---|---|---|---|
| Phosphonoacetic acid | Topical, 0.5% | | 5 | 100 |
| Disodium salt | Topical, 2% | | 5 | 70–100 |
| Phosphonoacetic acid | I.P. | 75 | 7 | 50 |
| Do | Oral | 300 | 7 | 50 |
| Disodium salt | do | 800 | 5 | 90 |

NOTE.—Non-treated control animals all died.

Example 2

The effectiveness of the disodium salt of phosphonoacetic acid against herpes simplex infection in mice was determined in the following manner. Mice were infected with herpes simplex virus, type 2 and treated as indicated with the disodium salt two hours post infection and each of the five days thereafter. Virus inoculation was accomplished by plucking the fur from the flank and back of anesthetized mice and placing a drop (0.05 ml.) of herpes virus on the surface of the plucked skin. Using a needle, the skin of the mouse was pricked through the drop of virus. The mice utilized for control purposes were not treated in any manner.

| Concentration | Route | Percent survivors | Condition of survivors |
|---|---|---|---|
| Virus controls | | 0 | |
| 2% | Topical | 100 | 70% no herpetic lesions, 30% paralyzed, with herpetic bands. |
| 800 mg./kg. | Oral | 100 | 80% no herpetic lesions, 20% paralyzed, with herpetic bands. |
| 1,000 mg./kg. | do | 100 | Do. |
| 1,200 mg./kg. | do | 100 | 90% no herpetic lesions. 10% paralyzed, with herpetic bands. |
| 1,400 mg./kg. | do | 100 | Do. |
| 1,600 mg./kg. | do | 60 | Do. |

From an examination of the results, it is apparent that the disodium salt of phosphonoacetic acid is active when administered topically at a concentration of two percent and orally from 800–1400 milligrams per kilogram (mg./kg.). When administered at 1600 mg./kg. daily for five days, the compound was toxic to mice in that 4 out of 10 animals died. At this dosage level, one additional mouse was paralyzed but showed no herpetic lesions. The condition of survivors of the full length of treatment is indicated. It should be noted that paralysis is due to the virus and not the drug.

Example 3

The antiviral activity against vaccinia virus of the compounds of this invention was evaluated in mice. The effectiveness of the compounds was determined by their ability to suppress the formation of tail lesions using the method of Boyle, J. J. et al., "Evaluation of Antiviral Compounds by Suppression of Tail Lesions in Vaccinia Infected Mice," Antimicrobial Agents and Chemotherapy, pp. 536–539 (1966). Ten to twelve gram mice were inoculated intravenously approximately 2 centimeters from the base of the tail with 0.05 milliliter undilute vaccinia virus. All of the compounds were prepared in tragacanth and 0.5 milliliter administered subcutaneously in the nape of the neck beginning 3 hours post infection and continuing once daily for 7 days. On the eighth day post infection, the mouse tails were swabbed with 0.25% methylene blue and the number of lesions counted. The control compound was methisazone.

| Compound | Dosage, mg./kg. | Number of lesions per mouse (N) | Avg. of $\sqrt{N}$ | Percent reduction |
|---|---|---|---|---|
| Normal control | | 0,0,0,0,0,0,0,0,0,0 | 0 | |
| Virus control | | 14, 30, 23, 20, 20, 9, 10, 13, 14, 15, 12 | 4.0 | |
| Methisazone | 200 | 3, 2, 2, 3, 0, 5, 3, 2, 2, 2 | 1.4 | 65 |
| Phosphonoacetic acid. | 100 | 3, 0, 1, 6, 6, 7, 6, 6, 4, 5 | 1.9 | 52 |

Example 4

Herpes keratitis in rabbits

Experimental procedure: Rabbits were anesthetized using the intravenous route of inoculation (pentobarbital sodium, 50 mg./ml. at 0.6 ml. per rabbit). The corneas of both eyes were denuded using a dry sterile swab, Herpes simplex virus, Type 1, 10% mouse brain suspension, 1 mouse $LD_{50}$, was swabbed over the surface of both eyes. The left eye of the rabbit was used as the untreated control whereas treatment of the right eye was started 2 hours post-infection, and continued with one application each hour for three hours. The treatments were continued as follows:

Post-infection day 1—$R_x$ every hour for 8 hours
Post-infection day 2—$R_x$ every hour for 8 hours
Post-infection day 3—$R_x$ every hour for 4 hours
Total=24 treatments.

Medication was applied as a 0.1% solution of phosphonoacetic acid.

The eyes of the rabbits were examined for corneal lesions from post-infection days 4 through 10. One drop of sodium fluorescein dye was added to each eye which was then examined with a Wood's ultraviolet lamp. The severity of the corneal lesions were rated as follows:

| Size of lesion (mm.): | Rating |
|---|---|
| None | 0 |
| 1–3 | 1 |
| 4–7 | 2 |
| 8–10 | 3 |
| Complete eye infected | 4 |

Results:

| Rabbit | Days post-infection | Herpes keratitis rating Control (left eye) | Herpes keratitis rating Treated (right eye) |
|---|---|---|---|
| 1 | 5 | >3 | 1 |
|   | 7 | 2 | 0 |
| 2 | 5 | 3 | <1 |
|   | 7 | 2 | <1 |
|   | 9 | 1 | <1 |

The compounds of the present invention can be dispensed in compositions comprising the active ingredients and excipients. The amount of active ingredient to be given daily depends on many factors such as the age and size of the warm-blooded animals and the severity of infection. A dosage of from 75 to 1400 mg./kg. of body weight is suitable and may be in a form to be administered one or more times per day or in smaller forms for multidaily or other more frequent administrations. When applied topically, an ointment containing from 0.2 to 10% active ingredient is suitable. The compounds can be formulated for use in a conventional manner well-known in the art, utilizing pharmaceutical excipients such as lactose, starch, magnesium stearate, glyceryl mono or distearate, talc or the like.

What is claimed is:

1. A method for treating virus infections selected from the group consisting of herpes dermatitis, herpes genitalis, herpes keratitis, and herpes encephalitis in an animal which comprises administering to an animal so infected an effective amount for combatting said virus infection of phosphonoacetic acid or an alkali metal salt thereof.

2. A method for treating viral infections caused by vaccinia virus in an animal which comprises administering to an animal so infected an effective amount for combatting vaccinia virus phosphonoacetic acid or an alkali metal salt thereof.

References Cited

Antibotic News, vol. 5, No. 9, pp. 1 and 3, October 1968.

Stock et al., Cancer Research, vol. 20, No. 5, part 2, pp. 193, 194 and 342 (No. 21041) (June 1960).

Cancer Research, vol. 21, No. 8, part 2, pp. 377, 378, and 451 (No. 26626) (September 1961).

Cancer Research, vol. 24, No. 2, part 2, pp. 211, 212, 227 and 378 (No. 49971) (February 1964).

JEROME D. GOLDBERG, Primary Examiner

UNITED STATES PATENT OFFICE
CERTIFICATE OF CORRECTION

Patent No. 3,767,795          Dated  October 23, 1973

Inventor(s) Joseph Bernard Schleicher and William R. Roderick

It is certified that error appears in the above-identified patent and that said Letters Patent are hereby corrected as shown below:

In Column 1 please delete $HO-\overset{\overset{O}{\|}}{C}-CH_3-\overset{\overset{O}{\|}}{P}(OH)_2$ and substitute $HO-\overset{\overset{O}{\|}}{C}-CH_2-\overset{\overset{O}{\|}}{P}(OH)_2$ .

In Column 1, line 57, please delete the first "group" and substitute "salts".

Signed and sealed this 17th day of September 1974.

(SEAL)
Attest:

McCOY M. GIBSON JR.          C. MARSHALL DANN
Attesting Officer            Commissioner of Patents